United States Patent [19]

Isley

[11] 4,176,830
[45] Dec. 4, 1979

[54] TIE DOWN CLAMP FOR VEHICLE MOUNTED CAMPER HOUSING

[76] Inventor: John C. Isley, 599 SW. 132 Ave., Fort Lauderdale, Fla. 33325

[21] Appl. No.: 886,045

[22] Filed: Mar. 13, 1978

[51] Int. Cl.² .............................................. B25B 1/04
[52] U.S. Cl. ........................................ 269/6; 269/143; 269/150; 269/238; 269/249; 269/285 MR
[58] Field of Search ......... 269/249, 254 CS, 289 MR, 269/150, 6, 238, 143; 30/95, 102; 81/95

[56] References Cited

U.S. PATENT DOCUMENTS

| | | | |
|---|---|---|---|
| 1,400,451 | 12/1921 | Morgan | 81/95 |
| 1,952,453 | 3/1934 | Mueller | 269/238 |
| 2,133,892 | 10/1938 | Gelinski | 269/249 |
| 3,336,642 | 8/1967 | Armacost | 269/143 |
| 3,408,738 | 11/1968 | Schode | 30/95 |

Primary Examiner—Robert C. Watson
Attorney, Agent, or Firm—Barry L. Haley; Eugene F. Malin

[57] ABSTRACT

A clamp useful for firmly securing a camper housing within the bed of a pickup truck which allows for efficient attachment or removal of the camper housing. The device includes a U-shaped clamp body having a pivotal connector at one end that is affixed to the camper housing and a reciprocally movable, spring biased arm having a roller at its free end such that the roller engages the lip of the pickup truck bed to permit pivotal movement over center to effect spring locking action of the clamp. The device allows a camper housing to be readily installed or removed from a vehicle bed by manual actuation of the holding clamps.

2 Claims, 6 Drawing Figures

U.S. Patent      Dec. 4, 1979      4,176,830
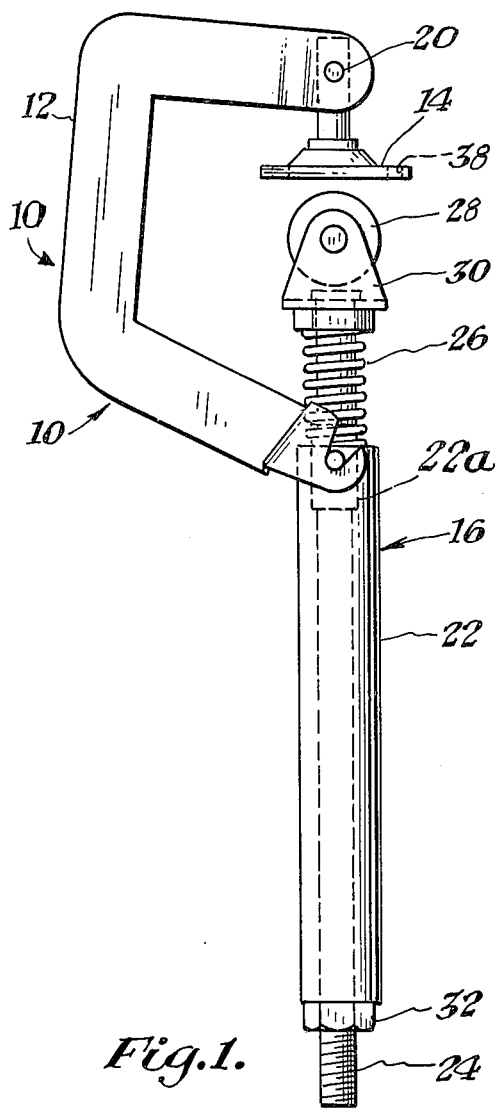
Fig. 1.
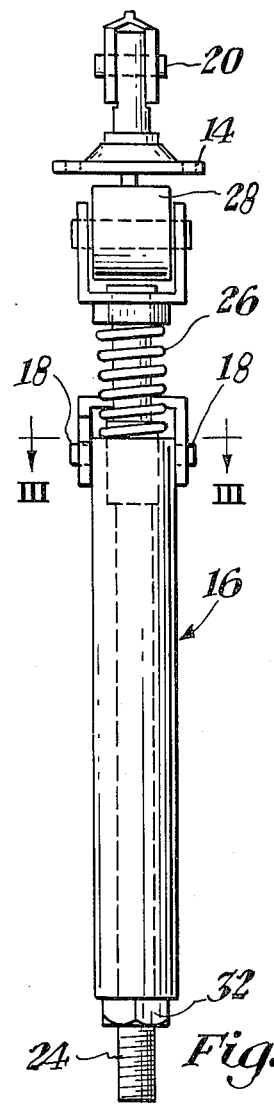
Fig. 2.
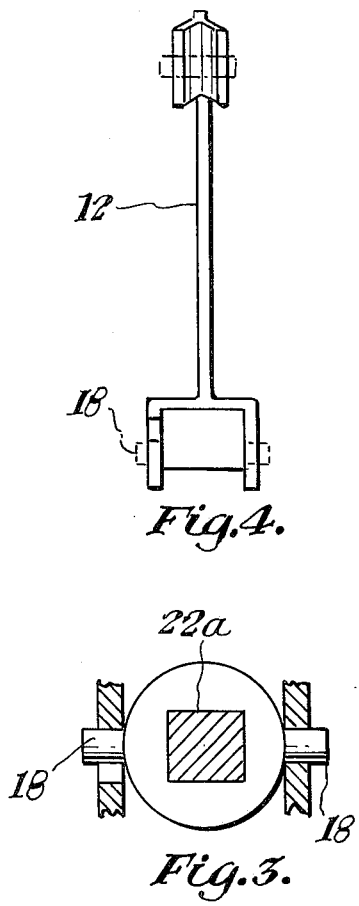
Fig. 4.
Fig. 3.
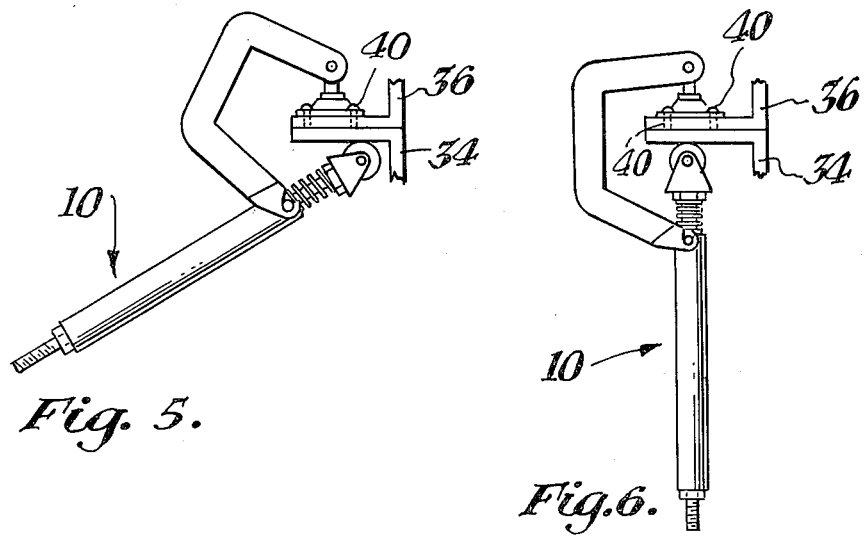
Fig. 5.
Fig. 6.

TIE DOWN CLAMP FOR VEHICLE MOUNTED CAMPER HOUSING

BACKGROUND OF THE INVENTION

This invention relates generally to work clamp which is useful for holding objects together such as for wood working or for removably mounting a camper housing in the bed of a pickup truck and, specifically, to an improved U-shaped clamp which includes a pivotally clamping arm reciprocally spring biased having a roller disposed on one end.

In recent years, pickup truck beds have been used with camper housings which allows the truck to be used interchangably for hauling materials or as a camper. Conventionally, camper housings are secured to the truck bed using screws, bolts and nuts and the like to effect a secure mounting. This mounting necessitates having special connector holes tapped in the truck bed panel and requires manipulation of each connector each time the housing is installed or removed.

The present invention overcomes these problems by providing a U-shaped clamp which is affixed to the camper housing that allows the camper housing to be quickly installed or removed from the bed without necessitating the use of connectors such as screws, nuts, or bolts. The present invention utilizes a clamp having a pivotal arm that is longitudinally biased by a spring or the like, the arm having a roller disposed at the end which engages the lip of the truck bed. The use of the present invention greatly reduces the installation or removal time of the camper housing while insuring a secure tie down of the camper housing to the truck bed.

BRIEF DESCRIPTION OF THE INVENTION

A clamp having a U-shaped rigid body, a first pivotal connector at one end of the U-shaped body (which may be attached to a camper housing or the like), and a spring biased locking arm pivotally coupled at the opposite end of the U-shaped body. The arm includes a shaft housing, a spring, and shaft that is longitudinally movable within the housing. A roller is mounted at one end of said shaft. The shaft is biased by the spring for longitudinal movement relative to the shaft housing. The length of the locking arm is adjustable by a threaded connector. The arm roller engages the lip of a truck bed such that as the arm is pivoted to the locked position, spring tension on the shaft (and roller) increases. In the locked position, the clamp will firmly hold the housing of the camper to the lip of the truck bed.

In operation, the pivotal connector at the upper end of the U-shaped body is connected to the camper housing by screws or the like to permanently retain the clamp on the camper housing. The camper housing is then positioned in the truck bed. The clamp pivot arm is moved relative to the camper truck bed upper lip so that the arm roller engages the bottom side of the truck bed lip, and is held in position by spring tension.

It is an object of this invention to provide an improved clamp for tying down a camper housing within the bed of a pickup truck.

It is another object of this invention to provide an improved readily manipulated clamp which allows for easy installation and removal of a camper housing within the bed of a pickup truck.

And yet, another object of this invention is to provide an improved work clamp for holding objects together utilizing a spring tensioned clamping arm.

In accordance with these and other objects which will be apparent hereinafter, the instant invention will now be described with particular reference to the accompanying drawings.

BRIEF DESCRIPTION OF THE DRAWINGS

FIG. 1 shows a side elevational view of the instant invention.

FIG. 2 shows a front elevational view of the instant invention.

FIG. 3 shows a cross-sectional view top plan of the instant invention through the lines III—III.

FIG. 4 shows a front elevational view of the clamp body utilized in the instant invention.

FIG. 5 shows a side elevational view of the instant invention just prior to actuation when joining two surfaces together.

FIG. 6 shows a side elevational view of the instant invention in which the instant invention is in a secured clamping position between two surfaces.

PREFERRED EMBODIMENT OF THE INVENTION

Referring now to the drawings and specifically FIG. 1, the instant invention is shown generally at 10 comprised of a U-shaped clamp body 12 having a connector 14 pivotally connected by pin 20 to the upper end of clamp body 12 and a locking arm 16 connected to the opposite end of the U-shaped clamp body 12 pivotally. The pivotal connector 14 includes a plurality of apertures 38 which may be utilized for afixing connector 14 to a surface that is to be clamped together, and in the preferred embodiment to a camper housing surface utilized in a truck bed.

The locking arm 16 includes a cylindrical housing 22 which receives an elongated shaft 24 having a threaded portion near its lower end for engagement with a nut 32 and a square portion 22a which engages a square aperture at the top of housing 22. Fixed to the upper end of shaft 24 is a roller housing 30 that receives roller 28, rotatably connected thereto by a pin. The locking arm 16 also includes a spring that is tensioned between the roller housing 30 and the upper end of housing 16, placing the shaft 24 which is movable relative to the housing 16 and spring tension. The housing includes a pair of protrusions 18 disposed at its upper end to allow for the pivotal connection of locking arm 16 with the U-shaped body 12. The cylindrical projections 18, one mounted on opposite sides of the housing 22. The protrusions form an axis 18 which allows the U-shaped clamp to pivot relative to the locking arm 16 while still allowing shaft 24 to move freely within the housing 22.

FIG. 3 shows the intermediate portion of shaft 24 having a square periphery 22a disposed in a square aperture in the housing 22 which prevents rotation of the shaft and thereby the roller afixed thereto so that the roller cannot be positioned incorrectly during the operation of the device FIG. 3 also clearly shows the protrusions 18 being unitarily formed as part of the upper portion of housing 22.

FIG. 4 shows the U-shaped clamp 12 and in phantom the protrusions 18 which are received through an aperture on one side of the U-shaped housing 12 and within a groove on the other side (FIG. 1).

In operation, the upper connector is mounted to a first object that is to be clamped while the roller portion of the arm when pivoted engages the second object to be clamped. By way of example, FIG. 5 shows a camper bed housing lip 36 to which upper connector is attached by screws 40 to permanently mount the clamp to the camper housing lip. Surface 34 represents the truck bed lip upon which the camper housing is mounted. As shown in FIG. 5, the clamp roller is positioned against the truck bed lip and rotated to a position as shown in FIG. 6 in which the shaft and roller then act to compress the spring, firmly holding the clamp in position. Thus, the clamp may be installed or removed merely by pivoting the locking arm from a first to a second position which either engages or disengages the spring tension provided on the roller.

Although in the preferred embodiment the usage was shown with the installation or removal of a camper housing on a truck bed, the instant invention has may applications as a work clamp for joining pieces together and holding them firmly while still allowing the clamp to be easily removed or installed.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A work clamp for holding two objects together, comprising:
    a U-shaped body;
    a first pivotal connector connected at one end of said U-shaped body;
    a locking arm pivotally connected to the other end of said U-shaped clamped body;
    a roller rotatably mounted at one end of said locking arm;
    a locking arm housing;
    a shaft mounted within said housing, said roller being connected at one end to said shaft; and
    a spring mounted on said shaft between said housing and said roller whereby said shaft and roller are movable longitudinally and are in spring tension.

2. A clamp as in claim 1, including:
    a means for adjusting the length of said shaft relative to said housing connected to said shaft.

* * * * *